United States Patent [19]

Robeson

[11] 4,324,869

[45] Apr. 13, 1982

[54] POLYARYLATE BLENDS WITH ETHYLENE-ALKYL ACRYLATE COPOLYMERS

[75] Inventor: Lloyd M. Robeson, Whitehouse Station, N.J.

[73] Assignee: Union Carbide Corporation, New York, N.Y.

[21] Appl. No.: 207,898

[22] Filed: Nov. 18, 1980

[51] Int. Cl.³ .................. C08L 33/08; C08L 67/02; C08L 73/00
[52] U.S. Cl. .................................... 525/68; 525/109; 525/127; 525/133; 525/132; 525/146; 525/147; 525/148
[58] Field of Search ............... 525/132, 109, 127, 133, 525/68, 146, 147, 148

[56] References Cited

U.S. PATENT DOCUMENTS

| | | | |
|---|---|---|---|
| 4,145,373 | 3/1979 | Baron et al. | 260/873 |
| 4,259,458 | 3/1981 | Robeson | 525/68 |
| 4,286,075 | 8/1981 | Robeson | 525/68 |

FOREIGN PATENT DOCUMENTS 53-92861  8/1978  Japan .

*Primary Examiner*—Carman J. Seccuro
*Attorney, Agent, or Firm*—Donald M. Papuga

[57] ABSTRACT

Described herein are molding compositions comprising a blend of (a) a polyarylate derived from a dihydric phenol and an aromatic dicarboxylic acid and (b) an ethylene-alkyl acrylate copolymer and, optionally, at least one thermoplastic polymer. An article molded from these compositions has a good balance of mechanical properties and improved hydrolytic stability.

35 Claims, No Drawings

POLYARYLATE BLENDS WITH ETHYLENE-ALKYL ACRYLATE COPOLYMERS

This invention is directed to a molding compostion comprising a blend of (a) a polyarylate derived from a dihydric phenol and an aromatic dicarboxylic acid and (b) an ethylene-alkyl acrylate copolymer and, optionally, at least one thermoplastic polymer compatible therewith.

Polyarylates are aromatic polyesters derived from a dihydric phenol, particularly 2,2-bis(4-hydroxyphenyl)-propane also identified as Bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

However, the hydrolytic stability of polyarylates is poor which results in poor mechanical properties if exposed to hydrolytic environment, under excessive time and/or temperature conditions. This deficiency also requires careful drying procedures of the polyarylate prior to melt processing.

It has now been found that when an ethylene-alkyl acrylate copolymer is blended with the polyarylate or polyarylate blended with a thermoplastic polymer, the hydrolytic stability of the polyarylate and polyarylate blend is improved. This is especially surprising since the addition of ethylene-vinyl acetate copolymer to polyarylate is not effective in increasing the hydrolytic stability of the polyarylates and in fact results in decreasing the hydrolytic stability. U.S. Pat. No. 4,145,373 teaches that ethylene and vinyl acetate copolymers improve the hydrolysis resistance of polycarbonate. Our results are opposite of that predicted by the above cited patent.

DESCRIPTION OF THE INVENTION

According to the present invention there is provided a molding composition comprising a blend of:
(a) a polyarylate derived from a dihydric phenol and at least one aromatic dicarboxylic acid,
(b) an ethylene-alkyl acrylate copolymer, and optionally,
(c) at least one thermoplastic polymer.

A preferred molding composition comprises a blend of:
(a) a polyarylate derived from a dihydric phenol and at least one aromatic dicarboxylic acid,
(b) an ethylene-alkyl acrylate copolymer, and
(c) a polyester derived from an aliphatic or cycloaliphatic diol, or mixtures thereof, and at least one aromatic dicarboxylic acid.

The thermoplastic polymers suitable for use herein include a polyester, an aromatic polycarbonate, a styrene polymer, an alkyl acrylate, a polyurethane, a vinyl chloride polymer, a poly(aryl ether), a copolyetherester block polymer, or a polyhydroxyether.

The polyarylate is used in the blend in amounts of from about 20 to about 99.8, preferably from about 50 to about 98; the ethylenealkyl acrylate copolymer is used in amounts of from 0.2 to about 15, preferably from about 1 to about 5; and when used the thermoplastic polymer is used in amounts of from 1 to about 78, preferably from about 5 to about 45 weight percent.

Polyarylates

The polyarylates of this invention are derived from a dihydric phenol and at least one aromatic dicarboxylic acid.

A particularly desirable dihydric phenol is of the following formula:

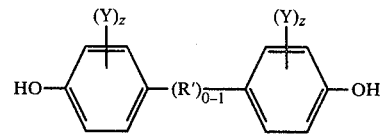

wherein Y is selected from alkyl groups of 1 to 4 carbon atoms, chlorine or bromine, each z, independently, has a value of from 0 to 4, inclusive, and R' is a divalent saturated or unsaturated aliphatic hydrocarbon radical, particularly alkylene and alkylidene radicals having from 1 to 3 carbon atoms, and cycloalkylene radicals having up to and including 9 carbon atoms. The preferred dihydric phenol is bisphenol-A. The dihydric phenols may be used individually or in combination.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,212 and 3,133,898.

Preferably, the polyarylates used in this invention are prepared by the process described in U.S. patent application Ser. No. 189,561, filed Sept. 23, 1980, in the names of L. M. Maresca, et al. and titled "Improved Process For Preparing Polyarylates".

This application describes an improved process for preparing a polyarylate having a reduced viscosity of from about 0.5 to greater than 1.0 dl/gm which process comprises the following steps:
(a) reacting an acid anhydride derived from an acid containing from 2 to 8 carbon atoms with at least one dihydric phenol to form the corresponding diester; and
(b) reacting said diester with at least one aromatic dicarboxylic acid at a temperature sufficient to form the polyarylate, wherein the improvement comprises removing residual acid anhydride, after formation of the dihydric phenol diester, so that its concentration is less than about 1500 parts per million.

Ethylene-Alkyl Acrylate Copolymers

The copolymers used in the present invention comprise units corresponding to ethylene and an alkyl ester of an acrylic acid. By alkyl acrylic ester for the purpose of this invention is meant an alkyl ester of an acrylic acid, as defined in Acrylic Resins, by Milton B. Horn, P. 15 under the subtitle "Monomer Chemistry," whereunder alkyl esters of both unsubstituted acrylic acid

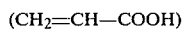
$(CH_2=CH-COOH)$ and simple alpha substituted acrylic acids such as those acrylic acids having a lower alkyl substituent, e.g., methacrylic acid

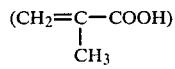
$$(CH_2=\underset{\underset{CH_3}{|}}{C}-COOH)$$

are included. Specific acrylic esters suitable for formulation of the copolymers include such as the methyl, ethyl, propyl, isopropyl, butyl, isobutyl, hexyl, t-butyl, 2-ethyl-hexyl, decyl, lauryl, and stearyl esters of acrylic or methacrylic acids. It will be obvious to those skilled in the art that the alkyl portion of the alkyl acrylate may also have, if desired, certain simple substituents which do not substantially interfere with the formation of the copolymers nor detract from their desirable properties, without departure from the scope and spirit of this invention. Presently, the preferred alkyl esters are the lower alkyl esters of simple acrylic acid, for example methyl, ethyl and butyl acrylates and methacrylates.

The preferred copolymer is ethylene-ethyl acrylate copolymer containing from about 1 to about 35 preferably from about 10 to about 20 percent by weight ethyl acrylate.

The ethylene-alkyl copolymers generally have a melt index (ASTM D-1238 at 44 psi. tested pressure) of about 1 to 50 decigrams per minute.

Thermoplastic Polymers

The thermoplastic polymers suitable for use in this invention are selected from the group consisting of a polyester polymer, an aromatic polycarbonate, a styrene polymer, an alkyl acrylate polymer, a polyurethane, a vinyl chloride polymer, a poly(aryl ether), a copolyetherester block polymer, a polydydroxyether, or combinations thereof.

A. Polyesters

The polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeating units of the following general formula:

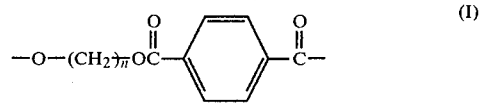

wherein n is an integer of from 2 to 4.

The preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

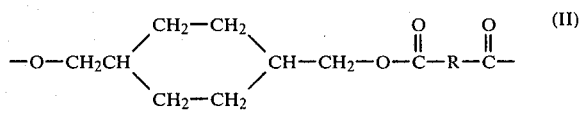

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic acids indicated by R in formula II, are isophthalic or terephthalic acid, 1,2-di(p-carboxyphenyl)ethane, 4,4'-dicarboxydiphenyl ether, etc., and mixtures of these. All of these acids contain at least one aromatic nucleus. Fused rings can also be present, such as in 1,4- or 1,5-naphthalenedicarboxylic acids. The preferred dicarboxylic acids are terephthalic acid or a mixture of terephthalic and isophthalic acids.

A preferred polyester may be derived from the reaction of either the cis- or trans-isomer (or a mixture thereof) of 1,4-cyclohexanedimethanol with a mixture of isophthalic- and terephthalic acids. These polyesters have repeating units of the formula:

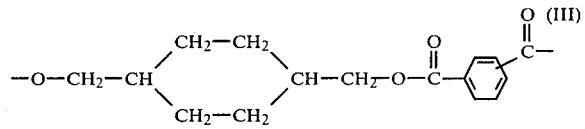

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolymer having repeating units of the following formula:

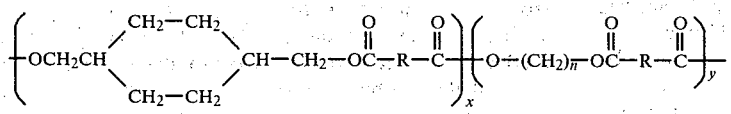

wherein the cyclohexane ring is selected from the cis- and trans-isomers thereof, R is as previously defined, n is an integer of 2 to 4, the x units comprise from about 10 to about 90 percent by weight and the y units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

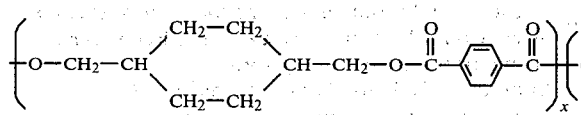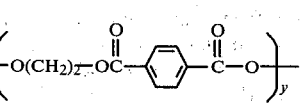

wherein x and y are as previously defined.

The polyester as described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g. as measured in a 60:40 phenol/tetrachloroethane mixture or similar solvent at 23°–30° C.

B. Aromatic Polycarbonate

The thermoplastic aromatic polycarbonates that can be employed herein are homopolymers and copolymers and mixtures thereof, which have an intrinsic viscosity of from about 0.4 to about 1.0 dl./g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl) heptane, 2-2-(3,5,3',5'-tetrabromo-4,4'-dihydroxydiphenyl)propane, (3,3'-dichloro-4,4'-dihydroxydiphenyl)methane, and the like. Other dihydric phenols of the bisphenol type are described in, for example, U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyesters, or with a dibasic acid in the event a carbonate copolymer or inter-polymer rather than a homopolymer is desired for use in the preparation of the aromatic carbonate polymer.

The carbonate precursor may be either a carbonyl halide, a carbonate ester, or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates, such as di-(chlorophenyl)carbonate or di-(bromophenyl)carbonate, etc., di-(alkylphenyl)carbonates such as di(tolyl)carbonate, di(naphthyl)carbonate, di(-chloronaphthyl)carbonate, etc. or mixtures thereof. The haloformates suitable for use herein include bis-haloformate of dihydric phenols for example, bischloroformates of bisphenol-A, of hydroquinone, etc. or glycols for example, bishaloformates of ethylene glycol, neopentyl glycol, polyethylene glycol, etc. While other carbonate precursors will be apparent to those skilled in the art, carbonyl chloride, also known as phosgene, is preferred.

The aromatic polycarbonate polymers may be prepared by methods well known in the art by using phosgene or a haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

A suitable acid acceptor may be either an organic or an inorganic acid acceptor. A suitable organic acid acceptor is a tertiary amine and includes materials, such as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of, for example, bisphenol-A with phosgene. Suitable catalysts include tertiary amines, such as triethylamine, tripropylamine, N,N-dimethylaniline, quaternary ammonium compounds, such as tetraethylammonium bromide, cetyl triethyl ammonium bromide, tetra-n-heptylammonium iodide, and quaternary phosphonium compounds, such as n-butyltriphenyl-phosphonium bromide and methyl-triphenyl phosphonium bromide.

The polycarbonates can be prepared on a one-phase (homogeneous solution) or two-phase (interfacial) systems when phosgene or a haloformate are used. Bulk reactions are possible when the diarylcarbonate precursors are used.

Also, aromatic polyester carbonates may be used. These are described in, for example, U.S. Pat. No. 3,169,121. The preferred polyester carbonate results from the condensation of phosgene terephthaloyl chloride, isophthaloyl chloride with bisphenol-A and a small amount of p-terebutylphenol.

C. Styrene Resin

The styrene resins suitable for use herein are ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

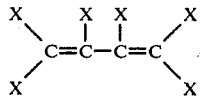

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generally described by the following formula:

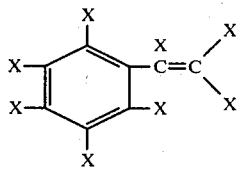

wherein X is as previously defined. Examples of the monovinylaromatic compounds and alkyl-, cycloalkyl,- aryl, alkaryl-, aralkyl, alkoxy-, aryloxy-, and other substituted vinylaromatic compounds include styrene, 3-methylstyrene; 3,5-diethylstyrene, 4-n-propylstyrene, α-methylstyrene, α-methyl vinyltoluene, α-chlorostyrene, α-bromostyrene, dichlorostyrene, dibromostyrene, tetra-chlorostyrene, mixtures thereof, and the like. The preferred monovinylaromatic hydrocarbons used are styrene and/or α-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as methyl methacylate.

The acrylonitrile, substituted acrylonitrile, or acrylic acid esters are described generally by the following formula:

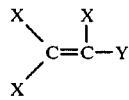

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, β-chloroacrylonitrile, α-bromoacrylonitrile, and β-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene-acrylonitrile copolymer. Also, there are occasions where a copolymer, such as α-methylstyrene-acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

D. Alkyl Acrylate Resin

The alkyl acrylate resin which may be used herein includes a homopolymer of methyl methacrylate (i.e. polymethyl methacrylate) or a copolymer of methyl methacrylate with a vinyl monomer (e.g. acrylonitrile, N-allylmaleimide, or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

E. Polyurethanes

The thermoplastic polyurethanes which may be used herein are described in, for example, U.S. Pat. No. 3,214,411. Particularly useful polyester resins used as starting materials for the thermoplastic polyurethanes are those produced from adipic acid and a glycol having a least one primary hydroxyl group. The adipic acid is condensed with a suitable glycol or mixture of glycols which have at least one primary hydroxyl group. The condensation is stopped when an acid number of from about 0.5 to about 2.0 is reached. The water formed during the reaction is removed such that the final water content is from about 0.01 to about 0.2%.

Any suitable glycol may be used in the reaction with the adipic acid such as, ethylene glycol, propylene glycol, butylene glycol, hexanediol, bis-(hydroxymethylcyclohexane), 1,4-butanediol, diethylene glycol, 2,2-dimethyl propylene glycol, 1,3-propylene glycol, and the like. In addition to the glycols, a small amount of trihydric alcohol of up to about 1% may be used, such as trimethylolpropane, glycerol, hexanetriol, and the like. The resulting hydroxyl polyester has a molecular weight of at least about 600, a hydroxyl number of from about 25 to about 190 and preferably between about 40 and about 60, and acid number of between about 0.5 and about 2 and a water content of 0.01 to about 0.2%.

The diisocyanates which may be used in preparing the polyurethanes include ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 2,2'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, pentamethylene diisocyanate, 1-chlorobenzene-2,4-diisocyanate, furfurylidene diisocyanate, and the like.

Any suitable chain extending agent having active hydrogen containing groups reactive with isocyanate groups may be used, such as diols, including ethylene glycol, propylene glycol, 1,4-butanediol, butenediol, butynediol, xylylene glycols, amylene glycols, 1,4-phenylene-bis-$\beta$-hydroxy ethyl ether, 1,3-phenylene-bis-$\beta$-hydroxy ethyl ether, bis-(hydroxy-methyl-cyclohexane), hexanediol, and the like; diamines, including ethylene diamine, cyclohexylene diamine, phenylene diamine, tolylene diamine, xylylene diamine, 3,3'-dichlorobenzidine, 3,3'-dinitrobenzidine and the like; alkanol amines such as ethanol amine, aminopropyl alcohol, 2,2-dimethyl propanol amine, 3-aminocyclohexyl alcohol, p-aminobenzyl alcohol, and the like. If desired, a small amount of polyfunctional material may be utilized. This polyfunctional chain extender, however, should not be present in an amount greater than about 1% by weight. Any suitable polyfunctional compound may be used in such as glycerol, trimethylolpropane, hexanetriol, pentaerythritol, and the like.

The polyester, the organic diisocyanate and the chain extender may be individually heated to a temperature of from about 60° to about 135° C. and then the polyester and chain extender are substantially simultaneously mixed with the diisocyanate. To increase the rate of reaction, any suitable catalyst may be used, such as tertiary amines and the like. Although adipate polyesters are preferred, polyesters may be used which are based on succinic acid, suberic acid, sebacic acid, oxalic acid, methyl adipic acid, glutaric acid, pimelic acid, azelaic acid, phthalic acid, terephthalic acid, isophthalic acid and the like. Polyesters based on $\epsilon$-caprolactone are also preferred.

A polyether may be used instead of the polyester in the preparation of the thermoplastic polyurethanes and preferably, polytetramethylene glycol having an averge molecular weight between about 600 and about 2000. Other polyethers, such as polypropylene glycol, polyethylene glycol and the like may be used providing their molecular weight is above about 600.

The thermoplastic polyurethanes are described in, for example, U.S. Pat. Nos. 2,621,166, 2,729,618, 3,214,411, 2,778,810 and 3,012,992.

F. Vinyl Chloride Polymers

The vinyl chloride polymers suitable for use herein are polyvinyl chloride and copolymers of vinyl chloride and copolymers of vinyl chloride with olefinically unsaturated polymerizable compounds which contain at least 80 percent by weight of vinyl chloride incorporated therein.

Olefinically unsaturated compounds which are suitable for copolymerization include vinylidene halides, such as vinylidene chloride and vinylidene fluoride, vinyl esters, such as vinyl acetate, vinyl propionate, vinyl butyrate, vinyl chloroacetate, vinyl benzoate, acrylate and $\alpha$-alkyl-acrylate and their alkyl esters, amides and nitriles, methacrylic acid, maleic acid or anhydride, methyl methacrylate, ethyl acrylate, 2-ethylhexylacrylate, butyl methacrylate, 2-hydroxypropyl acrylate, acrylamide, N-methyl acrylamide, acrylonitrile and methacrylonitrile, aromatic vinyl compounds, such as styrene and vinyl naphthalene and olefinically unsaturated hydrocarbons such as ethylene, bicyclo-[2,2,2]-hept-2-ene and bicyclo-[2,2,1]hepta-2,5-diene. Polymerized vinyl acetate may be hydrolyzed to provide vinyl alcohol moeities in the polymer.

These vinyl chloride polymers are well known in the art and can be prepared by the usual methods of solution, emulsion, suspension, bulk or mass polymerization.

Vinyl chloride polymers which have molecular weights of from about 40,000 to about 60,000 are preferred.

G. Poly(aryl ether)s

The poly(aryl ether) resin components suitable for use herein are linear, thermoplastic polyarylene polyether polysulfones, wherein the arylene units are interspersed with ether and sulfone linkages. These resins may be obtained by reaction of an alkali metal double salt of a dihydric phenol and a dihalobenzenoid compound, either or both of which contain a sulfone or ketone linkage i.e., $-SO_2-$ or $-CO-$ between arylene groupings, to provide sulfone or ketone units in the polymer chain in addition to arylene units and ether units. The polysulfone polymer has a basic structure comprising recurring units of the formula:

$$-O-E-O-E'-$$

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. Nos. 3,264,536, and 4,108,837, for example.

The residuum of a dihydric phenol, E is derived from dinuclear phenols having the structure:

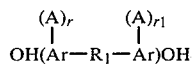

Wherein Ar is an aromatic group and preferably is a phenylene group, A and $A_1$ may be the same or different inert substitituent groups, such as alkyl groups having from 1 to 4 carbon atoms, halogen atoms, i.e., fluorine, chloride, bromine or iodine, or alkoxy radicals having from 1 to 4 carbon atoms, r and $r_1$ are integers having a value of from 0 to 4, inclusive, and $R_1$ is representative of a bond between aromatic carbon atoms as in dihydroxydiphenyl, or is a divalent radical, including, for example, CO, O, S, S—S $SO_2$ or a divalent organic hydrocarbon radical, such as alkylene, alkylidene, cycloalkylene, or the halogen, alkyl, aryl or like substituted alkylene, alkylidene and cycloalkylene radicals as well as alkarylene and aromatic radicals and a ring fused to both Ar groups.

Typical preferred polymers have recurring units having the following structure:

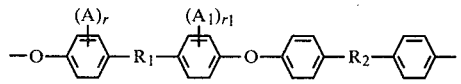

as described in U.S. Pat. No. 4,108,837, supra. In the foregoing formula A and $A_1$ can be the same or different inert substituent groups as alkyl groups having from 1 to 4 carbon atoms, halogen atoms (e.g., fluorine, chlorine, bromine or iodine) or alkoxy radicals having from 1 to 4 carbon atoms, r and $r_1$ are integers having a value of from 0 to 4, inclusive. Typically, $R_1$ is representative of a bond between aromatic carbon atoms or a divalent connecting radical and $R_2$ represents sulfone, carbonyl, or sulfoxide. Preferably, $R_1$ represents a bond between aromatic carbon atoms. Even more preferred are the thermoplastic polysulfones of the above formula wherein r and $r_1$ are zero, $R_1$ is a divalent connection radical of the formula

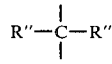

wherein R" is selected from lower alkyl, aryl, and the halogen substituted groups thereof, preferably methyl and $R_2$ is a sulfone group.

The poly(aryl ether)s have a reduced viscosity of from about 0.4 to about 1.5 dl/g as measured in an appropriate solvent at an appropriate temperature depending on the particular polyether, such as in methylene chloride at 25° C.

The preferred poly(aryl ether)s have repeating units of the formula:

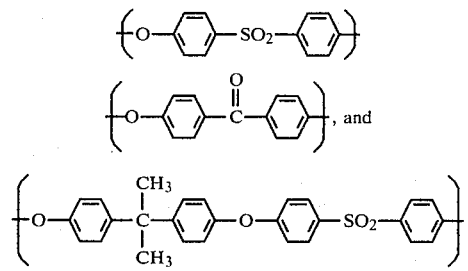

H. Copolyetherester Block Copolymer

The copolyetheresters suitable for use herein are well known in the art and are described in, for example, U.S. Pat. Nos. 3,784,520 and 3,766,146.

The polyester comprises a multiplicity of recurring intralinear long chain and short chain ester units connected head-to tail through ester linkages, said long chain ester units being represented by the following structure:

(a)

and said short chain ester units being represented by the following structure:

(b)

wherein G is a divalent radical remaining after removal of terminal hydroxy groups from a poly(alkylene oxide) glycol having a molecular weight of from about 400 to about 3500; D is a divalent radical remaining after removal of hydroxyl groups from a low molecular weight diol having a molecular weight of less than about 250; and $R_3$ is a divalent radical remaining after removal of carboxyl groups from a dicarboxylic acid having a molecular weight of less than about 300, with the proviso that the short chain ester units constitute from about 25 to about 65% by weight of the copolyester, at least about 70% of the $R_3$ groups are 1,4-phenylene radicals, at least about 70% of the D groups are 1,4-butylene radicals, and the sum of the percentages of the $R_3$ groups which are not 1,4-phenylene radicals and of the D groups which are not 1,4-butylene radicals do not exceed about 30%.

The term "long chain ester units" as applied to units in a polymer chain refers to the reaction product of a long chain glycol with a diacarboxylic acid. Such "long chain ester units", which are a repeating unit in the copolyesters herein correspond to the Formula (a) above. The long chain glycols may be poly(alkylene oxide) glycols having a molecular weight between about 400 and about 3500, preferably between about 600 and about 2000. Copolyesters prepared from poly(alkylene oxide) glycols having a molecular weight between about 600 to about 2000 are preferred.

The term "short chain ester units" as applied to units in a polymer chain refers to low molecular weight compounds or polymer chain units having molecular weight of less than about 550. Thye are made by reacting a low molecular weight diol (below about 250) with a dicarboxylic acid to form ester units represented by Formula (b) above.

Included among the low molecular weight diols (other than 1,4-butanediol) which react to form short chain ester units are acyclic, alicyclic and aromatic dihydroxy compounds. Preferred are diols with from 2 to 15 carbon atoms, such as ethylene, propylene, isobutylene, tetramethylene, pentamethylene, 2,2-dimethyltrimethylene, hexamethylene and decamethylene glycols, dihydroxy cyclohexane, cyclohexanedimethanol, resorcinol, hydroquinone, 1,5-dihydroxy naphthalene, etc. Especially preferred are aliphatic diols containing from 2 to 8 carbon atoms. Included among the bisphenols which can be used are bis(p-hydroxy)diphenyl, bis(p-hydroxyphenyl)methane, and bis(p-hydroxyphenyl)propane.

Dicarboxylic acids (other than terephthalic acid) which are reacted with the foregoing long chain glycols or low molecular weight diols to produce the copolyesters are aliphatic, cycloaliphatic or aromatic dicarboxylic acids.

Representative aliphatic and cycloaliphatic acids which may be used are sebacic acid, 1,3-cyclohexane dicarboxylic acid, 1,4-cyclohexane dicarboxylic acid, adipic acid, glutaric acid, succinic acid, carbonic acid, cyclopentanedicarboxylic acid, decahydro-1,5-naphthylene dicarboxylic acid, and 4,4-bicyclohexyl dicarboxylic acid. Preferred aliphatic acids are cyclohexanedicarboxylic acids.

Representative aromatic dicarboxylic acids which may be used are phthalic, terephthalic and isophthalic acids, substituted dicarboxy compounds with two benzene nuclei, such as bis(p-carboxyphenyl)methane and p-carboxyphenyl/oxybenzoic acid. Among the aromatic acids, those with from 8 to 16 carbon atoms are preferred, particularly the phenylene dicarboxylic acids, i.e., terephthalic and isophthalic acids.

Preferably, at least about 70 mole percent of the dicarboxylic acid incorporated into the polymer is terephthalic acid and at least about 70 mole percent of the low molecular weight diol incorporated into the polymer is 1,4-butanediol. Thus, at least 70% of the $R_3$ groups in Formulae (a) and (b) above are 1,4-phenylene radicals and at least about 70% of the D groups in Formula b above are 1,4-butylene radicals.

The most preferred copolyesters are those prepared from dimethylterephthalate, 1,4-butanediol and poly(tetramethylene oxide) glycol having a molecular weight of from about 600 to about 1500.

The copolyetheresters described herein can be made conveniently by a conventional ester interchange reaction by methods well known in the art and as described in, for example, U.S. Pat. Nos. 3,784,520 and 3,766,146.

I. Polyhydroxyether

The thermoplastic polyhydroxyethers which may be used herein have the following general formula

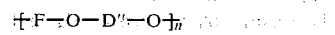

where F is the radical residuum of a dihydric phenol, D" is a radical residuum of an epoxide selected from mono- and diepoxides and which contain from 1 to 2 hydroxyl groups, and n is an integer which represents the degree of polymerization and is at least about 30 and preferably is above about 80.

In general, thermoplastic polyhydroxyethers are prepared by contacting, under polymerization conditions, a dihydric phenol and an expoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

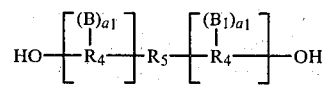

wherein $R_4$ is an aromatic divalent hydrocarbon radical, such as naphthylene and phenylene with phenylene being preferred, B and $B_1$ may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, a and $a_1$ are independently integers of 0 to 4, R' is alkylene, alkylidene, cycloalkylene or a saturated divalent group. Particularly preferred are dihydric polynuclear phenols having the general formula:

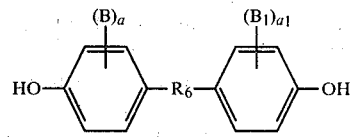

wherein B, $B_1$, a and $a_1$ are as previously defined, and $R_6$ is an alkylene or alkylidene group, preferably having from 1 to 3 carbon atoms, or cycloalkylene having 6 to 12 carbon atoms.

Diepoxides useful for the preparation of polyhydroxyethers may be represented by repeating units of the following formula

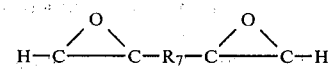

wherein $R_7$ is representative of a bond between adjacent carbon atoms or a divalent organic radical such as an aliphatic, aromatic, cyclic, heterocyclic or acyclic arrangement of atoms.

Other diepoxides which can be mentioned include those wherein two oxirane groups are linked through an aromatic ether, i.e., compounds having the grouping

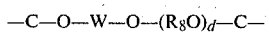

wherein $R_8$ is a divalent organic radical, W is a divalent aromatic radical residuum of a dihydric phenol, such as those listed above in the description of dihydric phenols, and d is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,294,747; and 3,277,051.

Other Ingredients

Other additives may be included in the composition of this invention. These additives include plasticizers; pigments; flame retardant additives, particularly, decabromodiphenyl ether and triaryl-phosphates, such as triphenylphosphate; reinforcing agents, such as glass fibers; thermal stabilizers; ultraviolet light stabilizers, processing aids, impact modifiers and the like. The impact modifiers which are particularly suitable for use herein as described in U.S. Pat. No. 4,231,922. These impact modifiers are a graft copolymer of a vinyl aromatic, an acrylate, an unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi.

The unsaturated elastomeric backbone may be polybutadiene, poly(butadiene-co-styrene), poly(butadiene-co-acrylonitrile), or poly(isoprene). In each of the polymers there is sufficient butadiene to give the polymer a rubbery character.

The constituents which are grafted onto the unsaturated elastomeric backbone are selected from a vinyl aromatic, such as styrene, α-methylstyrene, alkylstyrene, or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone.

These impact modifiers are free-flowing powders and are commonly available as impact modifiers for poly(vinyl chloride) as described in, for example, V. Shakaypal, in "Developments in PVC Technology", edited by J. H. L. Hensen and A. Whelan, Applied Science Publishers Ltd., New York, 1973.

The grafted constituents of the impact modifier comprise from about 20 to about 60 percent by weight of said constituents such that their tensile modulus does not exceed about 100,000 psi, and is preferably, between about 15,000 to less than about 100,000 psi.

Preparation

The compositions of this invention are prepared by any conventional mixing methods. For example, a preferred method comprises mixing the polyarylates, ethylene-alkyl acrylate copolymer and when used, the thermoplastic polymer(s) in powder or granular form in an extruder and extruding the mixture into strands, chopping the strands into pellets and molding the pellets into the desired article.

Examples

The following examples serve to give specific illustrations of the practice of this invention but they are not intended in any way to limit the scope of this invention.

Control A 80 weight percent of a polyarylate (prepared from Bisphenol-A and a mixture of 50 mole percent of terephthalic acid chloride and 50 mole percent of isophthalic acid chloride by conventional methods) having a reduced viscosity of 0.66 dl/g as measured in p-chlorophenol at 49° C., and 20 weight percent of a poly(ethylene terephthalate) having an intrinsic viscosity of 0.64 as measured in 60:40 phenol/tetrachloroethane at 23° C. were blended in an extruder at about 300° C. The mixture was then injection molded at 290°–320° C. into ASTM test specimens. The test specimens were then immersed in water at 100° C. Samples were tested after 28, 63, 105 and 154 hours of exposure for the following physical properties: Tensile modulus, tensile strength and elongation according to ASTM D-638 and notched izod impact strength according to ASTM D-256.

The results are shown in Table I.

Control B 99 weight percent of the mixture of Control A was blended with 1 weight percent of an ethylene-vinyl acetate copolymer (containing 18% by weight of vinyl acetate; Melt Index of 2.5 dg/min) by the procedure and under the conditions described in Control A. The blend was then compression molded and tested, as described in Control A.

The results are shown in Table I.

Control C 99 weight percent of the mixture of Control A was blended with 1 weight percent of ethylene-vinyl acetate copolymer (containing 33 by weight of vinyl acetate; Melt Index of 5.0 dg/min) by the procedure and under the conditions described in Control A. The blend was then injection molded and tested, as described in Control A.

The results are shown in Table I.

Control D 97 weight percent of the mixture of Control A was blended with 3 weight percent of the ethylene-vinyl acetate copolymer described in Control C by the procedure and under the conditions described in Control A. The blend was then injection molded and tested, as described in Control A.

The results are shown in Table I.

EXAMPLE 1

99 weight percent of the mixture of Control A was blended with 1 weight percent of an ethylene-alkyl acrylate copolymer (containing 20% by weight of ethyl acrylate; Melt Index of 2.5 dg/min) by the procedure and under the conditions described in Control A. The blend was then injection molded and tested; as described in Control A.

The results are shown in Table I.

EXAMPLE 2

99 weight percent of the mixture of Control A was blended with 1 weight percent of an ethylene-ethyl acrylate copolymer (containing 18% by weight of ethyl acrylate; Melt Index of 6 dg/min) by the procedure and under the conditions described in Control A. The blend was then injection molded and tested, as described in Control A.

The results are shown in Table I.

EXAMPLE 5

95 weight percent of the mixture in Control A was blended with 5 weight percent of the ethylene-ethyl acrylate copolymer described in Example 3 by the procedure and under the conditions described in Control

TABLE I

| Example | Description of the Composition Polymer | wt. % | Hours of exposure in Water at 100° C. | Tensile modulus (psi) | Tensile strength (psi) | Elongation (%) | Notched Izod Impact Strength (ft.-lbs./in. of notch) |
|---|---|---|---|---|---|---|---|
| Control A |  |  | 0 | 334,000 | 9,920 | 75 | 2.6 |
|  | PA | 80 | 28 | 352,000 | 10,7000 | 15.0 | 1.5 |
|  | PET | 20 | 63 | 356,000 | 7,760 | 2.5 | 1.3 |
|  |  |  | 105 | 361,000 | 4,600 | 1.3 | 1.0 |
|  |  |  | 154 | 400,000 | 2,240 | 0.6 | 0.6 |
| Control B |  |  | 0 | 329,000 | 9,840 | 58 | 3.0 |
|  |  |  | 28 | 345,000 | 10,600 | 11.2 | 1.2 |
|  | PA (80) | 99 | 63 | 332,000 | 6,170 | 2.0 | 0.8 |
|  | PET (20) |  | 105 | 347,000 | 4,220 | 1.3 | 0.7 |
|  | EVA | 1 | 154 | 430,000 | 2,410 | 0.6 | 0.2 |
| Control C |  |  | 0 | 331,000 | 9,820 | 53 | 2.7 |
|  |  |  | 28 | 344,000 | 9,180 | 4.0 | 1.3 |
|  | PA (80) | 99 | 63 | 341,000 | 4,200 | 1.3 | 1.1 |
|  | PET (20) |  | 105 | 363,000 | 3,110 | 0.90 | 0.2 |
|  | EVA | 3 | 154 | 421,000 | 2,140 | 0.5 | 0.2 |
| Control D |  |  | 0 | 320,000 | 9,490 | 26 | 4.2 |
|  |  |  | 28 | 327,000 | 3,520 | 1.1 | 0.4 |
|  | PA (80) | 97 | 63 | 351,000 | 2,280 | 0.7 | 0.3 |
|  | PET (20) |  | 105 | 360,000 | 1,890 | 0.5 | 0.2 |
|  | EVA | 1 | 154 | 390,000 | 1,230 | 0.4 | 0.2 |
| 1 |  |  | 0 | 318,000 | 9,740 | 92 | 3.4 |
|  |  |  | 28 | 341,000 | 10,500 | 12.7 | 1.6 |
|  | PA (80) | 99 | 63 | 345,000 | 10,600 | 8.8 | 1.3 |
|  | PET (20) |  | 105 | 347,000 | 6,000 | 1.9 | 0.7 |
|  | EEA | 1 | 154 | 409,000 | 3,750 | 1.0 | 0.4 |
| 2 |  |  | 0 | 325,000 | 9,660 | 83 | 3.4 |
|  |  |  | 28 | 342,000 | 10,500 | 13.3 | 1.7 |
|  | PA (80) | 99 | 63 | 374,000 | 10,600 | 6.9 | 1.2 |
|  | PET (20) |  | 105 | 355,000 | 6,660 | 2.1 | 1.1 |
|  | EEA | 1 | 154 | 381,000 | 3,390 | 1.0 | 0.3 |

Control E

The blend of Control A, i.e., 80 weight percent of polyarylate and 20 weight percent of poly(ethylene terephthalate) was prepared by the procedure and under the conditions described in Control A. The blend was then injection molded into ASTM test bars as described in Control A. The test bars were then immersed in boiling water. The tensile strength and notched izod impact strength were measured after boiling water exposure of 104 and 139 hours.

The results are shown in Table II.

EXAMPLE 3

99 weight percent of the mixture of Control A was blended with 1 weight percent of an ethylene-ethyl acrylate copolymer (containing 18% by weight of ethyl acrylate; Melt Index of 3) by the procedure and under the conditions described in Control A. The blend was then compressed molded and tested, as described in Control E.

The results are shown in Table II.

EXAMPLE 4

97 weight percent of the mixture described in Control A was blended with 3 weight percent of the ethylene-ethyl acrylate copolymer described in Example 3 by the procedure and under the conditions described in Control A. The blend was then compressed molded and tested, as described in Control E.

The results are shown in Table II.

A. The blend was then injected molded as described in Control A and tested as described in Control E.

The results are shown in Table II.

Control F 60 weight percent of the polyarylate described in Control A was blended with 40 weight percent of the poly(ethylene-terephthalate) described in Control A by the procedure and under the conditions described in Control A. The blend was then injection molded as described in Control A and tested as described in Control E.

The results are shown in Table II.

EXAMPLE 6

95 weight percent of the mixture of Control G was blended with 5 weight percent of the ethylene-ethyl acrylate copolymer described in Example 3 by the procedure and under the conditions described in Control A. The blend was then injection molded as described in Control A and tested as described in Control E.

The results are shown in Table II.

TABLE II

| Example | Description of the Composition Polymer | wt. % | Tensile Strength After Boiling Water exposure (psi) at 104 | 139 (hours) | Notched Izod Impact Strength After Boiling Water Exposure (ft.lbs./in. of notch) 104 | 139 (hours) |
|---|---|---|---|---|---|---|
| Control E | PA | 80 | 2220 | 1790 | 0.47 | 0.41 |

TABLE II-continued

| Example | Description of the Composition Polymer | wt. % | Tensile Strength After Boiling Water exposure (psi) at 104 | 139 (hours) | Notched Izod Impact Strength After Boiling Water Exposure (ft.lbs./in. of notch) 104 | 139 (hours) |
|---|---|---|---|---|---|---|
| 3 | PA | (80) | 4420 | 3020 | 0.52 | 0.46 |
|   | PET | (20) 97 |  |  |  |  |
|   | EEA | 1 |  |  |  |  |
| 4 | PA | (80) | 7200 | 4320 | 1.01 | 0.95 |
|   | PET | (20) 97 |  |  |  |  |
|   | EEA | 3 |  |  |  |  |
| 5 | PA | (80) | 8520 | 5580 | 1.24 | 0.96 |
|   | PET | (20) 95 |  |  |  |  |
|   | EEA | 5 |  |  |  |  |
| Control F | PA | 60 | 5050 | 3480 | 0.29 | 0.28 |
|   | PET | 40 |  |  |  |  |
| 6 | PA | (60) 95 | 5660 | 4330 | 1.06 | 0.66 |
|   | PET | (40) |  |  |  |  |
|   | EEA | 5 |  |  |  |  |

Control G

A mixture of 78 weight percent of the polyarylate/poly(ethylene terephthalate) mixture described in Control F, 10 weight percent of decabromodiphenyl oxide, 10 weight percent of Blendex 436 (a styrene/butadiene/acrylontrile/acrylate) terpolymer having a tensile modulus of 17,400 psi, and sold by Borg-Warner Company), and 2 weight percent of antimony oxide were extrusion blended at about 270° C. The extrudate was chopped into pellets. The pelletized product was then injection molded into ASTM test specimens at 270°–300° C. using a Newbury 1¼ ounce screw injection molding machine.

The test specimens were then measured for the following properties: tensile modulus, tensile strength, elongation and notched izod impact strength.

The results are shown in Table III.

EXAMPLE 7

To a mixture of 98 weight percent of the blend described in Control G was added 2 weight percent of an ethylene-ethyl acrylate copolymer (18 wt. % ethyl acrylate; Melt Index of 6 dg/min). The mixture was extrusion blended, injection molded and tested as described in Control G.

The results are shown in Table III.

The data clearly show that the addition of an ethylene-ethyl acrylate copolymer to the antimony oxide containing blends leads to greatly improved ductility and toughness.

What is claimed is:
1. A molding composition comprising a blend of:
 (a) a polyarylate derived from a dihydric phenol and an aromatic dicarbocxylic acid, and
 (b) an ethylene-ethyl acrylate copolymer.
2. A composition as defined in claim 1 wherein the dihydric phenol is of the formula:

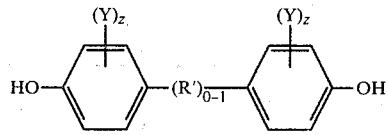

wherein Y is selected from alkyl groups of 1 to 4 carbon atoms, chlorine or bromine, each z, independently, has a value of from 0 to 4, inclusive, and R' is a divalent saturated or unsaturated aliphatic hydrocarbon radical selected from alkylene and alkylidene radicals having from 1 to 3 carbon atoms, and cycloalkylene radicals having up to and including 9 carbon atoms.
3. A composition as defined in claim 2 wherein each z is 0 and R' is an alkylidene radical of 3 carbon atoms.
4. A composition as defined in claim 1 wherein the aromatic dicarboxylic acid is a mixture of isophthalic and terephthalic acids.
5. A composition as defined in claim 1 wherein the ethylene-ethyl acrylate copolymer is an ethylene-ethyl acrylate copolymer.
6. A composition as defined in claim 1 which contains a thermoplastic polymer selected from the group consisting of a polyester, an aromatic polycarbonate, a styrene polymer, an alkyl acrylate polymer, a polyurethane, a vinyl chloride polymer, a poly(aryl ether), a copolyetherester block copolymer, a polyhydroxyether, and combinations thereof.
7. A composition as defined in claim 6 wherein the thermoplastic polymer is a polyester.
8. A composition as defined in claim 7 wherein the polyester has repeating units of the general formula:

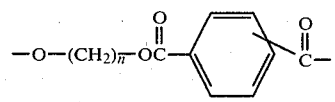

9. A composition as defined in claim 8 wherein the polyester is poly(ethylene terephthalate).
10. A composition as defined in claim 6 wherein the thermoplastic polymer is an aromatic polycarbonate.

TABLE III

| Example | Description of the Composition Materials | wt. % | Tensile modulus (psi) | Tensile strength (psi) | Elongation (%) | Notched Izod Impact Strength (ft.-lbs./in. of notch) | Tensile Impact Strength (ft-lbs/in³) |
|---|---|---|---|---|---|---|---|
| Control G | PA | 46.8 | 311,000 | 7,450 | 3.6 | 0.26 | 7 |
|   | PET | 31.2 |  |  |  |  |  |
|   | DBDPO | 10.0 |  |  |  |  |  |
|   | Blendex | 10.0 |  |  |  |  |  |
|   | Sb₂O₃ | 2.0 |  |  |  |  |  |
| Example 7 | PA (46.8) | 98.0 | 288,000 | 7,050 | 21.7 | 0.88 | 23 |
|   | PET (31.2) |  |  |  |  |  |  |
|   | DBDPO (10) |  |  |  |  |  |  |
|   | Blendex (10) |  |  |  |  |  |  |
|   | Sb₂O₃ (2.0) |  |  |  |  |  |  |
|   | EEA | 2.0 |  |  |  |  |  |

DBDPO - decabromodiphenyl oxide
Sb₂O₃ - antimony oxide

11. A composition as defined in claim 10 wherein the aromatic polycarbonate is the reaction product of a dihydric phenol and a carbonate precursor.

12. A composition as defined in claim 11 wherein the dihydric phenol is bisphenol-A and the carbonate precursor is carbonyl chloride.

13. A composition as defined in claim 6 wherein the thermoplastic polymer is a styrene polymer.

14. A composition as defined in claim 13 wherein the styrene resin is prepared by polymerizing a conjugated diene monomer or a conjugated diene monomer with a monomer copolymerizable therewith or an acrylic acid ester to provide an elastomeric backbone and thereafter grafting at least one grafting monomer onto said backbone.

15. A composition as defined in claim 14 wherein the conjugated diene monomer is butadiene and the grafting monomer is selected from styrene, an acrylonitrile, an acrylic acid ester, or mixtures thereof.

16. A composition as defined in claim 13 wherein the styrene resin is a butadiene/styrene/acrylonitrile resin.

17. A composition as defined in claim 6 wherein the thermoplastic polymer is an alkyl acrylate polymer.

18. A composition as defined in claim 17 wherein the alkyl acrylate is poly(methyl methacrylate).

19. A composition as defined in claim 17 wherein the alkyl acrylate is a copolymer of methyl methacrylate and a vinyl monomer wherein the amount of methyl methacrylate is greater than about 70 percent by weight of the copolymer.

20. A composition as defined in claim 19 wherein the vinyl monomer is selected from acrylonitrile, N-allylmaleimide, N-vinylmaleimide or an alkyl acrylate or methacrylate, wherein the alkyl group contains from 1 to 8 carbon atoms.

21. A composition as defined in claim 17 wherein the alkyl acrylate is alkyl acrylate grafted onto an unsaturated elastomeric backbone, wherein the alkyl acrylate comprises greater than about 50 weight percent of the graft copolymer formed.

22. A composition as defined in claim 6 wherein the thermoplastic polymer is a polyurethane.

23. A composition as defined in claim 22 wherein the polyurethane is derived from a polyester resin having a molecular weight of at least about 600, an aromatic diisocyanate, and a low molecular weight chain extender having active hydrogen containing groups which are reactive with the diisocyanate.

24. A composition as defined in claim 22 wherein the polyurethane is derived from a polyether, an organic diisocyanate, and a low molecular weight chain extender having active hydrogen containing groups which are reactive with isocyanate.

25. A composition as defined in claim 24 wherein the polyether is selected from polytetramethylene glycol having an average molecular weight between about 600 and about 2000, polypropylene glycol, and polyethylene glycol having a molecular weight above about 600.

26. A composition as defined in claim 6 wherein the thermoplastic polymer is a poly(vinyl chloride) polymer.

27. A composition as defined in claim 26 wherein the poly(vinyl chloride) polymer is a copolymer of vinyl chloride with an olefinically unsaturated polymerizable compound which contains at least about 80 percent by weight of vinyl chloride incorporated therein.

28. A composition as defined in claim 6 wherein the thermoplastic polymer is a poly(aryl ether).

29. A composition as defined in claim 28 wherein the poly(aryl ether) comprises recurring units of the formula:

wherein E is the residuum of a dihydric phenol and E' is the residuum of a benzenoid compound having an inert electron withdrawing group.

30. A composition as defined in claim 29 wherein the poly(aryl ether) has recurring units having the formula:

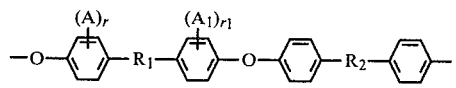

A and $A_1$ can be the same or different inert substituent groups and are selected from alkyl groups having from 1 to 4 carbon atoms, fluorine, chlorine, bromine, iodine, or alkoxy radicals having from 1 to 4 carbon atoms, $R_1$ represents a bond between aromatic carbon atoms or a divalent connecting radical, $R_2$ is sulfone, carbonyl or sulfoxide, r and $r_1$ are integers having a value of from 0 to 4, inclusive.

31. A composition as defined in claim 30 wherein r and $r_1$ are 0, $R_2$ is $SO_2$, and $R_1$ is the following

32. A composition as defined in claim 6 wherein the thermoplastic polymer is a copolyetherester block copolymer.

33. A composition as defined in claim 32 wherein the copolyetherester block copolymer has a multiplicity of recurring intralinear long chain and short chain ester units connected head-to-tail through ester linkages, said long chain ester units being represented by the following structure:

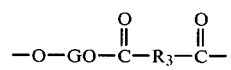

and said short chain ester units being represented by the following structure

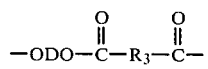

wherein G is a divalent radical remaining after removal of terminal hydroxy groups from a poly(alkylene oxide) glycol having a molecular weight of from about 400 to about 3500, D is a divalent radical remaining after removal of hydroxyl groups from a low molecular weight diol, and $R_3$ is a divalent radical remaining after removal of carboxyl groups from a dicarboxylic acid; with the provisos that the short chain ester units constitute from about 25 to 65% by weight of the copolyester, at least about 70% of the $R_3$ groups are 1,4-phenylene radicals, at least about 70% of the D groups are 1,4-butylene radicals, and the sum of the percentages of the $R_3$ groups which are not 1,4-phenylene radicals and of the D groups which are not 1,4-butylene radicals do not exceed about 30%.

34. A composition as defined in claim 6 wherein the thermoplastic polymer is a polyhydroxyether.

35. A composition as defined in claim 34 wherein the polyhydroxyether has the general formula $$F\!-\!O\!-\!E''\!-\!O\!\frac{}{\phantom{x}}_n$$

wherein F is the radical residuum of a dihydric phenol, E'' is a radical residuum of an epoxide selected from mono-and diepoxides containing from 1 to 2 hydroxyl groups and n is an integer which represents the degree of polymerization and is at least about 30.

* * * * *

UNITED STATES PATENT AND TRADEMARK OFFICE
CERTIFICATE OF CORRECTION

PATENT NO. : 4,324,869
DATED : April 13, 1982
INVENTOR(S) : L. M. Robeson

It is certified that error appears in the above-identified patent and that said Letters Patent is hereby corrected as shown below:

Column 2, line 50, delete "3,824,212" and insert therefore ---3,824,213---.

Column 3, line 37, delete "acrylic acid" and insert therefore ---acrylic acids---.

Column 4, line 67, delete "copolymer" and insert ---copolyester---.

Column 6, line 49, delete "prepared on" and insert therefore ---prepared in---.

Column 6, line 59, delete "p-terebutylphenol" and insert therefore ---p-tertbutylphenol---.

Signed and Sealed this

Third Day of January 1984

[SEAL]

Attest:

GERALD J. MOSSINGHOFF

Attesting Officer   Commissioner of Patents and Trademarks

UNITED STATES PATENT OFFICE
CERTIFICATE OF CORRECTION

Patent No. 4,324,869            Dated    13 April 1982

Inventor(s)   Robeson, Lloyd M.

It is certified that error appears in the above-identified patent and that said Letters Patent are hereby corrected as shown below:

Column 20, line 5, delete "ethyl", and insert therefore --- alkyl ---.

Column 20, line 29, delete "ethyl", first occurrence, and insert therefore --- alkyl ---.

Signed and Sealed this

First Day of September, 1987

*Attest:*

DONALD J. QUIGG

*Attesting Officer*      *Commissioner of Patents and Trademarks*